United States Patent [19]

Pietras et al.

[11] Patent Number: 5,298,992
[45] Date of Patent: Mar. 29, 1994

[54] SYSTEM AND METHOD FOR FRAME-DIFFERENCING BASED VIDEO COMPRESSION/DECOMPRESSION WITH FORWARD AND REVERSE PLAYBACK CAPABILITY

[75] Inventors: Mark A. Pietras, Boynton Beach; Arturo A. Rodriguez; Andres J. Saenz, both of Boca Raton, all of Fla.

[73] Assignee: International Business Machines Corporation, Armonk, N.Y.

[21] Appl. No.: 958,403

[22] Filed: Oct. 8, 1992

[51] Int. Cl.⁵ .............................................. H04N 7/137
[52] U.S. Cl. ................................... 348/415; 358/335; 358/310; 348/472
[58] Field of Search ............... 358/133, 136, 335, 13, 358/310; H04N 7/137

[56] References Cited

U.S. PATENT DOCUMENTS

| | | |
|---|---|---|
| 3,185,824 | 5/1965 | Blasbalg ........................... 358/136 |
| 3,553,362 | 1/1971 | Mounts ............................. 358/136 |
| 4,047,221 | 9/1977 | Yasuda et al. . |
| 4,651,206 | 3/1987 | Ohki . |
| 4,704,628 | 11/1987 | Chen et al. . |
| 4,723,161 | 2/1988 | Koga . |
| 4,785,349 | 11/1988 | Keith et al. . |
| 4,942,465 | 7/1990 | Ohta . |
| 4,969,040 | 11/1990 | Gharavi . |
| 4,969,042 | 11/1990 | Houtman et al. . |
| 4,982,285 | 1/1991 | Sugiyama . |
| 4,985,768 | 1/1991 | Sugiyama . |
| 4,987,490 | 1/1991 | Ohta . |
| 5,079,630 | 1/1992 | Golin et al. . |
| 5,119,192 | 6/1992 | Hirashima ........................... 358/136 |

*Primary Examiner*—Howard W. Britton
*Attorney, Agent, or Firm*—Andrew J. Dillon; Paul W. O'Malley

[57] ABSTRACT

A process for coding a plurality of compressed video data streams in a time ordered sequence. Each compressed data stream includes coding of frame to frame differences of a video segment, which are represented as a compressed M×N exclusive-OR plane of pixel change values and location displacement control values for an output pointer into a decompressed video frame. By coding frame to frame differences in an exclusive-OR values, the replay process is made bidirectional, allowing for both forward and reverse playback of the video segment.

32 Claims, 6 Drawing Sheets

SYSTEM AND METHOD FOR FRAME-DIFFERENCING BASED VIDEO COMPRESSION/DECOMPRESSION WITH FORWARD AND REVERSE PLAYBACK CAPABILITY

BACKGROUND OF THE INVENTION

1. Technical Field

The invention relates to the storage and playback of digitized video segments on a display device of a digital computer, and more particularly relates to a system and a method of data compression and decompression that supports real-time recovery and reconstruction, with both forward and reverse playback, of the digitized video segment on a minimal personal computer system. Still more particularly, the invention relates to a software-based method for real-time video decompression and playback with a computational load readily carried by the central processing unit (CPU) of low-end personal computers (e.g. a computer based upon an Intel 80386SX microprocessor running at 16 MHz).

2. Description of the Related Art

A video signal is a sequence of images or frames, which when displayed in sequence at a given frame rate (e.g., 15 to 30 frames-per-second in a personal computer), simulates the appearance of motion to a human observer. In a personal computer system, each frame of the digitized video is an array of picture elements or "pixels", which are the minimum unit for assignment of color and intensity information. A frame may have in excess of half a million pixels. If full frames were replaced at the frame rate in excess of 15 frames-per-second, a computer would be required to recover from storage and write to video memory several million pixels each second. Few contemporary auxiliary data storage devices have both the bandwidth required to pass such quantities of data and the storage capacity to hold more than a few full frames of digital video information. As used here, bandwidth means the volume of data per unit time which can be recovered from an auxiliary storage device.

Data compression is used to accommodate auxiliary storage devices in the storage and recovery of digitized video segments for playback in real time. Data compression is based on eliminating redundant information from the frames of a digital video segment. The idea is to convey only that information which changes from frame to frame. Consider an image of a person standing unmoving against a constant or near constant background, such as the sky. As long as the person remained still, the information changing from frame to frame would be minimal. A perfect data compression technique would reduce the data stored for each frame to little more than a place holder for each frame indicating the passage of time. As the person began to speak, information indicating that the pixels in the location around the person's mouth are changing from frame to frame can be specified. Such a video compression technique is a type of frame differencing video compression, which is designed to pass only information relating to particular pixel locations which differ from one frame to the next.

A frame compressed by a frame-differencing process has consisted of two separate entities. One is a mechanism to denote the addresses (or locations) in the frame of the pixels that differed from the previous frame. The second entity is the values of the pixels that changed (i.e., the new information). A binary bit map is used to mark the pixels of a frame which differed from the previous frame. Such a map would be an M×N array of "1's" and "0's" corresponding to the M×N array of pixels in a frame. The values of the pixels which change follow in a sequential list.

To generate a bit map, corresponding pixel locations in each frame are compared to determine if a change took place. If an 8 bit value (usually called one byte) is used to represent the color value of each pixel that changed, considerable reduction of the data over a full frame is attained. If two or three bytes are used to represent the color value of the uncompressed digital video data, the amount of attained compression is commensurately larger. Where the number of changed pixels within each frame remains small, substantial savings in storage space and reduction in bandwidth demands are achieved.

Data so compressed reduces the amount of storage space required, allowing compressed digital video data to be stored in storage devices that have low sustained read rates (i.e., bandwidth) like compact disk read only memory (CD-ROM) and read/write (R/W) optical storage devices, and alleviate the CPU burden of reading the video data from storage and writing it to the video buffer of display devices such as the Extended Graphics Array (XGA) and super video graphics adaptor (SVGA) that drive display monitors. Frame-differencing video compression processes can be implemented in low-end personal computers with addition of programming, only because they offer a reasonable amount of data compression while simultaneously providing a data format of low computational complexity for real-time decompression and display.

Frame-differencing techniques require a processor to decompress compressed digital video information and to rewrite the changed portions of the frame to the video buffer. In low-end personal computers this processor will be the system central processing unit (CPU). Frame-differencing techniques relieve the CPU of the burden of rewriting of the entire video buffer every one fifteenth of a second, which otherwise can overload microprocessors such as an Intel 80386SX running at 16 Mhz.

Frame-differencing processes that can decompress a compressed video stream with low computational complexity code the information which differs from one frame to the next and inherently provide a forward direction of playback. A video segment replayed by updating the video buffer of the display device with only the information in a frame that is different from the previous frame does not provide for recovering and reconstruction of frames earlier in time. Reverse playback with frame-differencing methods of low computational complexity in decompression have not been done because the earlier frames cannot be reconstructed from the compressed video stream.

Providing a frame-differencing process for digital video compression which also permits reverse playback without requiring additional data storage capacity and without adding to the computational complexity of the decompression process would represent improved capability and is desirable.

SUMMARY OF THE INVENTION

It is therefore one object of the invention to provide an improved method of storage of a digital video segment for both forward and reverse playback.

It is another object of the invention to provide a method of data compression and decompression that supports real-time recovery, reconstruction, and display of digital video segments on a minimal personal computer system.

It is yet another object of the invention to provide a software based method for video decompression and playback with a computational load readily carried by the central processing unit (CPU) of low-end personal computers.

The foregoing objects are achieved as is now described. The invention provides a system and method for coding differences between frames of a digital video signal as an exclusive-OR plane and compressing the exclusive-OR planes into a compressed video data stream. Data streams from several time ordered frames are then stored in a time ordered sequence. Each compressed data stream includes pixel change values from the exclusive-OR plane and location displacement control values for an output pointer into a decompressed video frame. By coding frame-to-frame differences as an exclusive-OR plane, the replay process is made two directional, allowing for both forward and reverse playback of the video segment.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

"OS/2" and "PS/2" are registered trademarks of International Business Machines Corporation in the United States. "80386SX" is a registered trademark of Intel Corporation in the United States.

Figure 1:
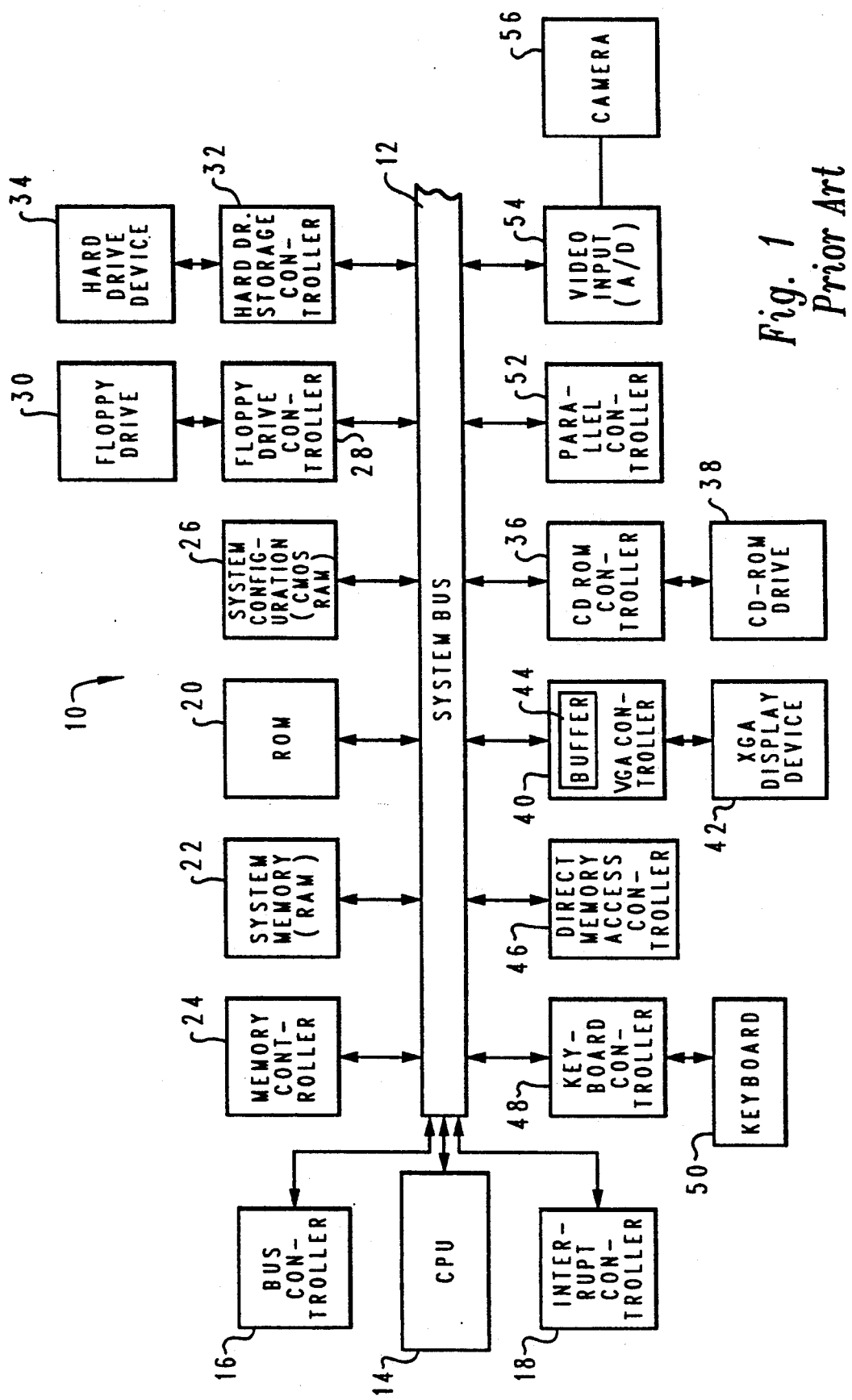
FIG. 1 is a high level block diagram of a data processing system utilized to implement the method of the present invention.

With reference now to the figures and in particular with reference to FIG. 1, there is depicted a block diagram of a personal computer system 10, preferably an IBM PS/2 personal computer. Computer system 10 includes a 16-bit wide system bus 12. Connected to system bus 12 is a central processing unit (CPU) 14, preferably based on an Intel 80386SX or equivalent microprocessor, clocked at a minimum of 16 MHz. CPU 14 passes data to and receives data from other devices attached to system bus 12 over the system bus. Traffic on the bus is controlled by a bus controller 16. An interrupt controller 18 handles interrupts passed between CPU 14 and the remaining devices.

Read only memory (ROM) 20 is non-volatile memory storing power on test processes and a basic input/output system (BIOS or ROM-BIOS). BIOS is microcode controlling basic hardware operations such as CPU 14 interaction with disk drives and a keyboard. System memory 22 is addressable random access memory into which an operating system and programs are loaded for execution. The IBM OS/2 operating system is a preferred operating system. Additional hardware components of computer 10 attached to system bus 12 include a memory controller 24 and a system configuration store 26, provided by random access memory (RAM) having low refresh power requirements (e.g. complimentary metal oxide semiconductor based memory).

Auxiliary data storage is provided by peripheral controllers and associated storage devices including, a floppy disk or diskette controller 28 and drive 30, a hard drive controller 32 and hard drive device 34, and a compact disk (CD) read only memory (ROM) controller 36 with CD-ROM drive 38. Digital video signals, compressed in accordance with the system and method of the invention, may be supplied to computer system 10 from compressed video data stored on portable media mounted in CD-ROM drive 38. After decompression by CPU 14, visual reproduction of video segments is carried out preferably over a extended graphics array (XGA) controller 40 and XGA display 42. XGA controller 40 includes a RAM buffer 44 in which the current frame for display is stored. In some computers, buffer 44 may be loaded directly from system memory 22 or from an auxiliary storage controller. In system 10, CPU 14 handles loading of decompressed data for each new frame to the appropriate locations in buffer 44 for updating the frame.

Direct memory access (DMA) controller 46 handles data transfers between auxiliary storage devices or other input/output devices, and system memory 22 without interaction by CPU 14. Keyboard controller 48 provides an interface to a keyboard 50, for user entries, and may be used to provide an interface to a "mouse". Parallel controller 52 is a device controller for an input or output device (e.g. a printer connected to computer 10 by a parallel cable).

Decompressed video signals may come from a number of sources, including graphics generated by an application program executing on CPU 14 or from a video camera 56 and an associated video interface 54. Video interface 54 converts an analogue National Television Standards Committee (NTSC) video signal into a digital video signal. The digital signal is a series of frames comprising arrays of bytes conveying intensity or color information (e.g. RGB values) for the picture elements. The frames are presented in a time ordered sequence. Digital video signals supplied by video input interface 54 are processed by CPU 14 to produce a compressed video signal comprising an initial frame and subsequent frame difference information for storage on a hard drive device 34. Alternatively, a CD-ROM may store a video segment as data compressed in accordance with the invention. CPU 14 may thereafter recover the segment in the form of the compressed video signal from drive 34 or drive 38 for reproduction of the digital video on display 42.

Figure 2:
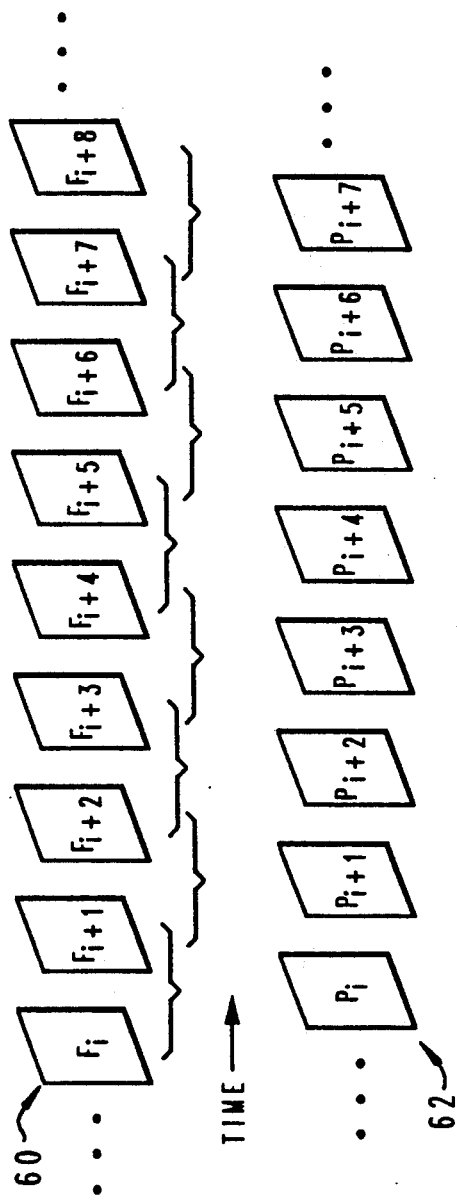
FIG. 2 is a diagram of successive video frames for a video segment and associated exclusive-OR planes.

FIG. 2 illustrates a time ordered sequence 60 of video frames $F_i$ from a digital video signal. A frame $F_i$ represents an M×N array of bytes of quantized color information relating to an M×N array of pixels of an image. Further illustrated are a time ordered sequence 62 of exclusive-OR planes $P_i$. Exclusive-OR planes $P_i$ are M×N arrays of bytes related to adjacent frames $F_i$ and $F_{i+1}$ by the following function:

$$F_i XOR\ F_{i+1} = P_i \qquad (1)$$

where the XOR operator is a bit by bit exclusive OR operation. A bit location in $P_i$ assumes the value 1 where values in the corresponding bit location of the adjacent frames differ, and the value 0 where the values in the corresponding bit location of the adjacent frames are the same.

Where equation (1) holds the following two relationships also hold:

$$P_i XOR\ F_i = F_{i+1}, \text{ and} \qquad (2)$$

$$P_i XOR\ F_{i+1} = F_i. \qquad (3)$$

By coding the video data with exclusive-OR planes $P_i$, equation (2) can be used to play the video forward and equation (3) can be used to play the video in reverse. The process thereby provides improved random-access capability useful for interactive viewing and video editing. The process offers the additional advantage of unifying the two frame-differencing process entities: a first entity identifying the location of the pixels; and a second giving the values of the changed pixels.

Figure 3:
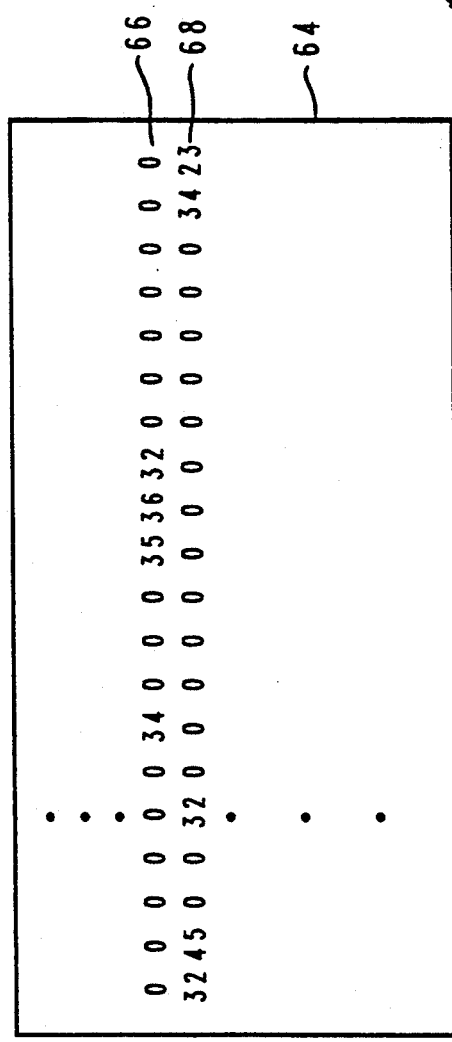
FIG. 3 is a diagram of an exclusive-OR plane and a compressed video data stream representing a portion of the plane.

FIG. 3 illustrates an exclusive-OR plane 64 in which rows 66 and 68 represent the product of an exclusive OR operation on portions of two adjacent video frames. The exclusive-OR plane 64 is represented at the byte level, because for coding purposes it is more efficient for an Intel 80386SX or comparable CPU to handle data in a byte format. A segment of compressed data stream 70 comprises a compressed representation of rows 66 and 68 in which: the first byte (having the value 06) represents a string of 6 consecutive zero bytes beginning row 66; the second byte (having the value 34) represents occurrence of a single byte having a non-zero value and that value; the third byte (having the value 3) represents the number of consecutive zeros occurring after the "34"; the fourth and fifth bytes (0 and 3 respectively) indicate a string of 3 consecutive non-zero bytes, the values (35, 36, and 32) for which follow the three; the zero following the 32 indicates the end of the row (no other non-zero bytes were encountered before the end of row 66); the next 0 in the stream indicates that a string of 0 zero bytes began row 68; the next two bytes $00_{hex}$ and $02_{hex}$, respectively, indicate a string of two non-zero bytes (32 and 45), which follow; the "2" following the "45" indicates a string of two zero bytes; the "32" occurring then is a solitary occurrence of a changed byte; the "13" following the "32" indicates a chain of thirteen zero bytes; the following byte, "0" and "2", indicate a chain of two values (34 and 23), which follow; and the last 0 indicates the end of row.

Figure 4:
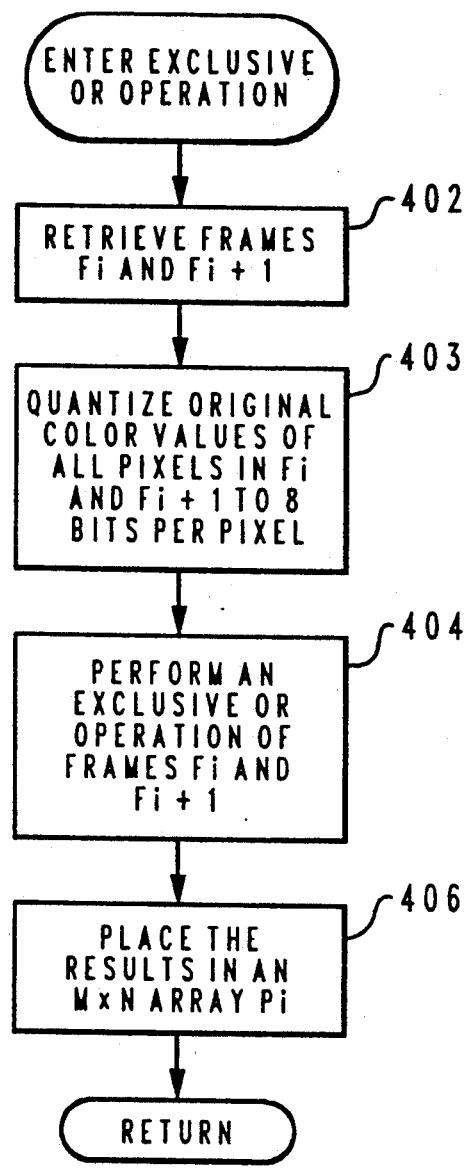
FIG. 4 is a logical flow chart of a process for generating an exclusive-OR plane.

FIG. 4 is a logical flow chart of the exclusive-OR operator for generating an exclusive-OR plane. The process is entered at step 402 with retrieval of adjacent frames $F_i$ and $F_{i+1}$. The color value of each pixel in frames $F_i$ and $F_{i+1}$ is converted to an 8-bit quantized color value in step 403. At step 404 an exclusive-OR operation is performed on the bits of the frames and at step 406 results of the operation are placed in a frame of the same size called the exclusive-OR plane.

Assuming that moving objects in the video clips are non-textured, and much wider than one pixel, and that their motion is sufficiently slow to appear as frame differences of one pixel in width, most non-vertical motion will be exhibited in the rows of an exclusive-OR plane as one pixel that changed followed by a sequence of pixels that did not change. Based on these assumptions and the fact that the computational complexity to decompress the video data must be kept low, a lossless process for compression of the exclusive-OR plane is provided.

Figure 5A:
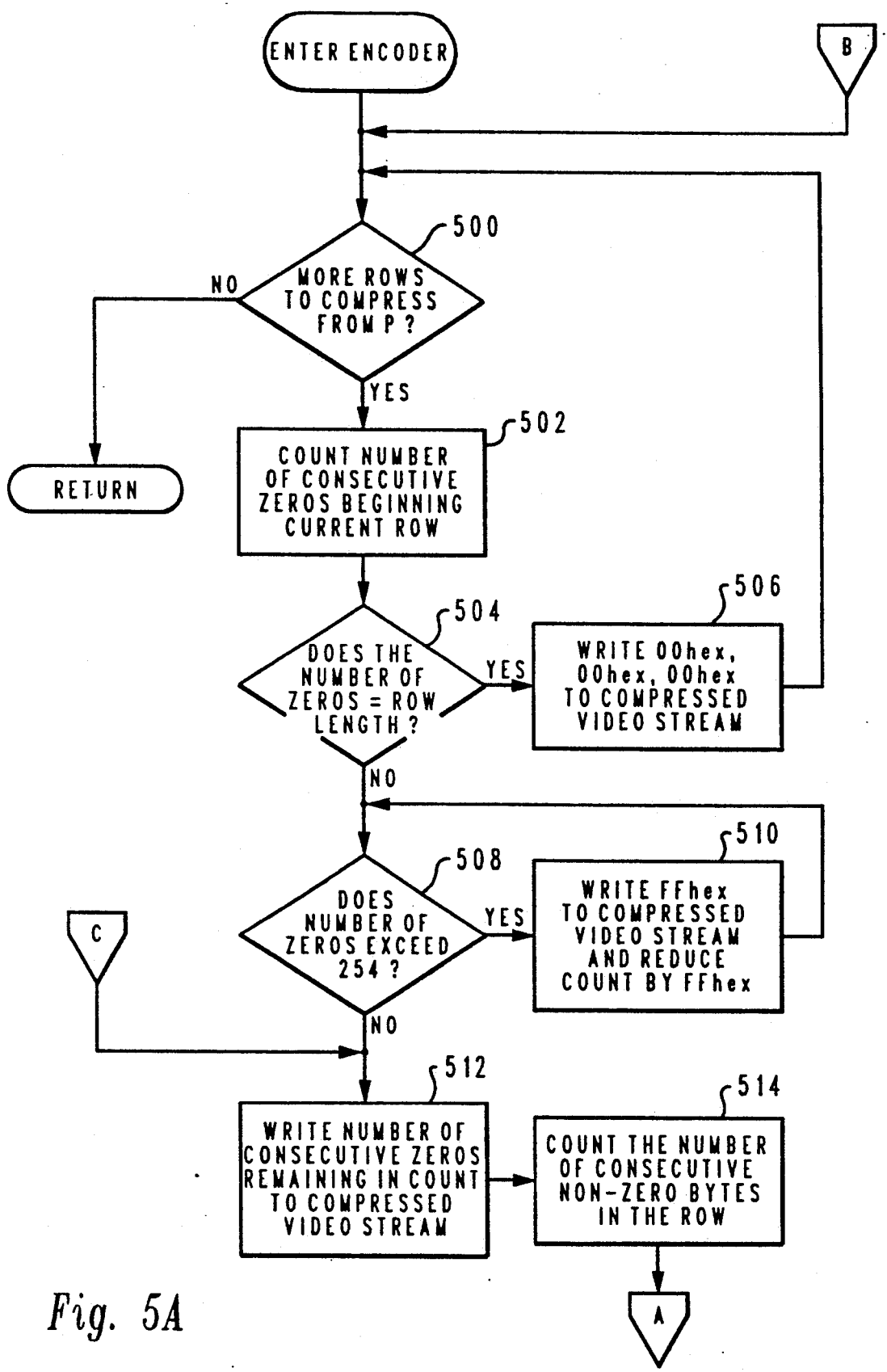
FIGS. 5A and 5B are logical flow charts of a process for video data compression used in implementing the system and method of the present invention.

FIG. 5A illustrates the lossless encoding process for an exclusive-OR plane 64. The process is entered for encoding each exclusive-OR plane. With execution of step 500 it is determined if any rows of the current plane remain for compression. If not, the NO branch leads out of the process. If rows to compress remain, the YES branch is taken to step 502, where a count is made of the number of consecutive zeros beginning the row. It is anticipated that relatively few pixels will change from frame to frame, resulting in long chains of zeros in the exclusive-OR plane. If a row is all zeros, the number of consecutive zeros counted will equal the length of the row in bytes. If this occurs it is detected at step 504. The YES branch is taken to step 506, which results in three consecutive bytes having the value $00_{hex}$ being written to the compressed video stream to mark an empty row and the process returning to step 500 to determine if another row remains for compression.

If non-zero bytes occur in a row, the number of consecutive zero bytes beginning the row will be fewer than the total number of bytes in the row. With execution of steps 508, 510 and 512, the count of the number of consecutive zeroes is written to the compressed stream. Because the maximum number which can be expressed in one (8-bit) byte is $FF_{hex}$ (255) steps 508 and 510 are provided for procuring additional bytes in the compressed stream to write the full count. If there are no zero bytes in the beginning of a row, step 512 writes $00_{hex}$ to the compressed video stream. If the total number of consecutive zero bytes at the beginning of a row equals 255, $FF_{hex}$ followed by $00_{hex}$ will be written to the compressed video stream by steps 510 and 512.

Figure 5B:
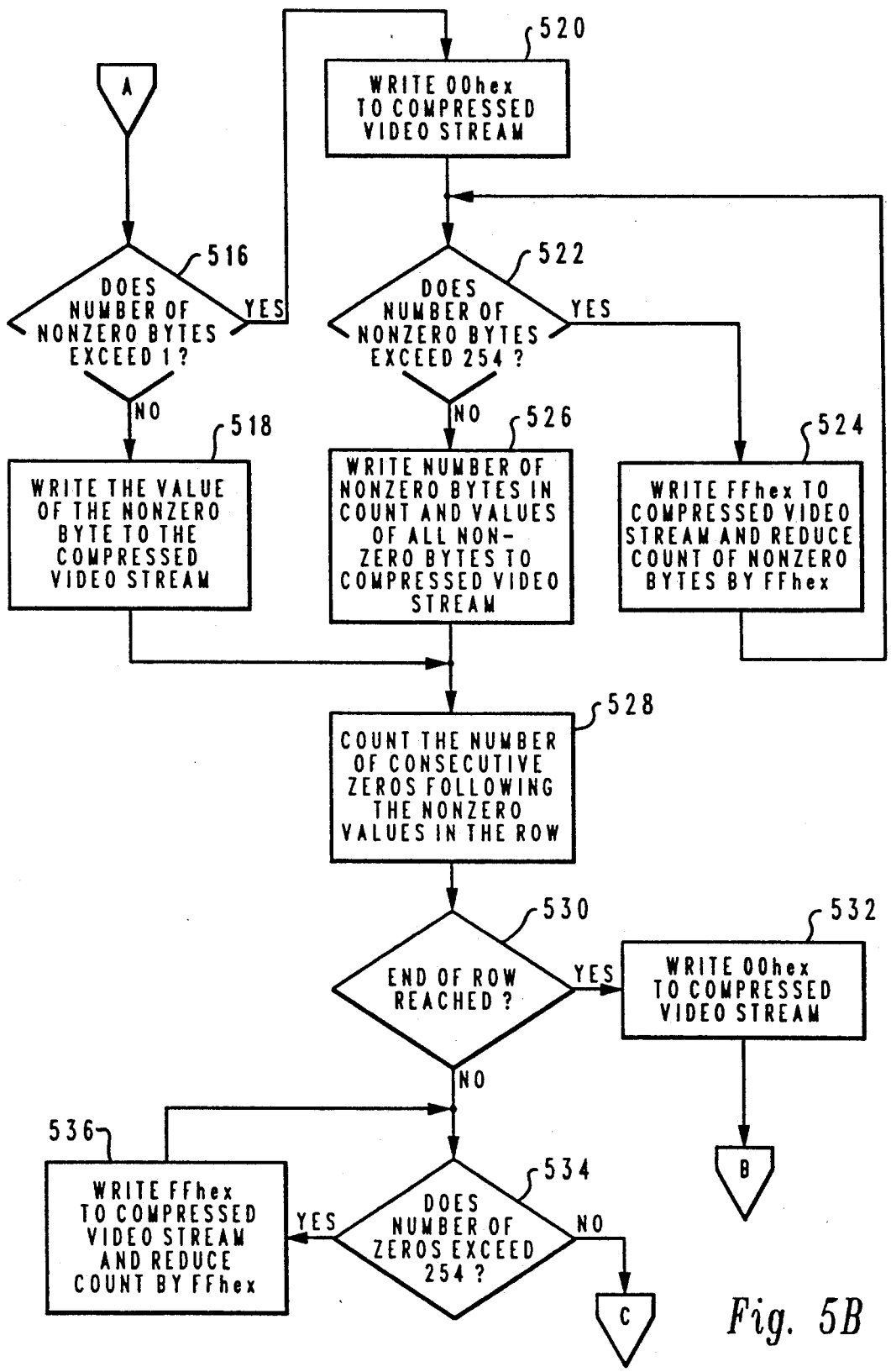

Next, with execution of step 514, a count is made of the consecutive non-zero bytes in the current row of the exclusive-OR plane. Continuing in FIG. 5B at step 516, the count is compared with "1". If the number of consecutive non-zero bytes is one, the value of the non-zero byte is written to the compressed video stream at step 518. If more than one consecutive non-zero byte is counted, step 520 is executed to write a single $00_{hex}$ to the compressed video stream. Steps 522, 524 and 526 are provided to write the number of consecutive non-zero bytes to the compressed video stream, followed by the values of the bytes themselves. The process of writing the number of consecutive non-zero bytes is complicated by allowing for the possibility that the count may exceed $FE_{hex}$. Steps 522 and 524 provide for taking extra bytes in the compressed stream for expressing numbers larger than $FE_{hex}$. A count of $FF_{hex}$ is expressed as $00_{hex}$, $FF_{hex}$, $00_{hex}$ by steps 520, 522, 524, and 526.

Step 528 follows steps 518 or 526. At step 528 the number of consecutive zero bytes following the prior non-zero value is counted. Next, at step 530 it is determined whether the end of the current row was reached during the count. If YES, step 532 is executed to write $00_{hex}$ to the compressed stream and the process is returned to step 500. If NO, step 534 is executed to determine if the number of consecutive zeroes exceeds $FE_{hex}$. If it does, step 536 is executed to write $FF_{hex}$ to the compressed stream and to subtract $FF_{hex}$ from the count of consecutive zero bytes. Step 534 is then reexecuted to determine if the count has been reduced below $FF_{hex}$. The cycle is repeated until the count falls below $FF_{hex}$. The NO branch from step 534 returns the process to step 512.

Figure 6:
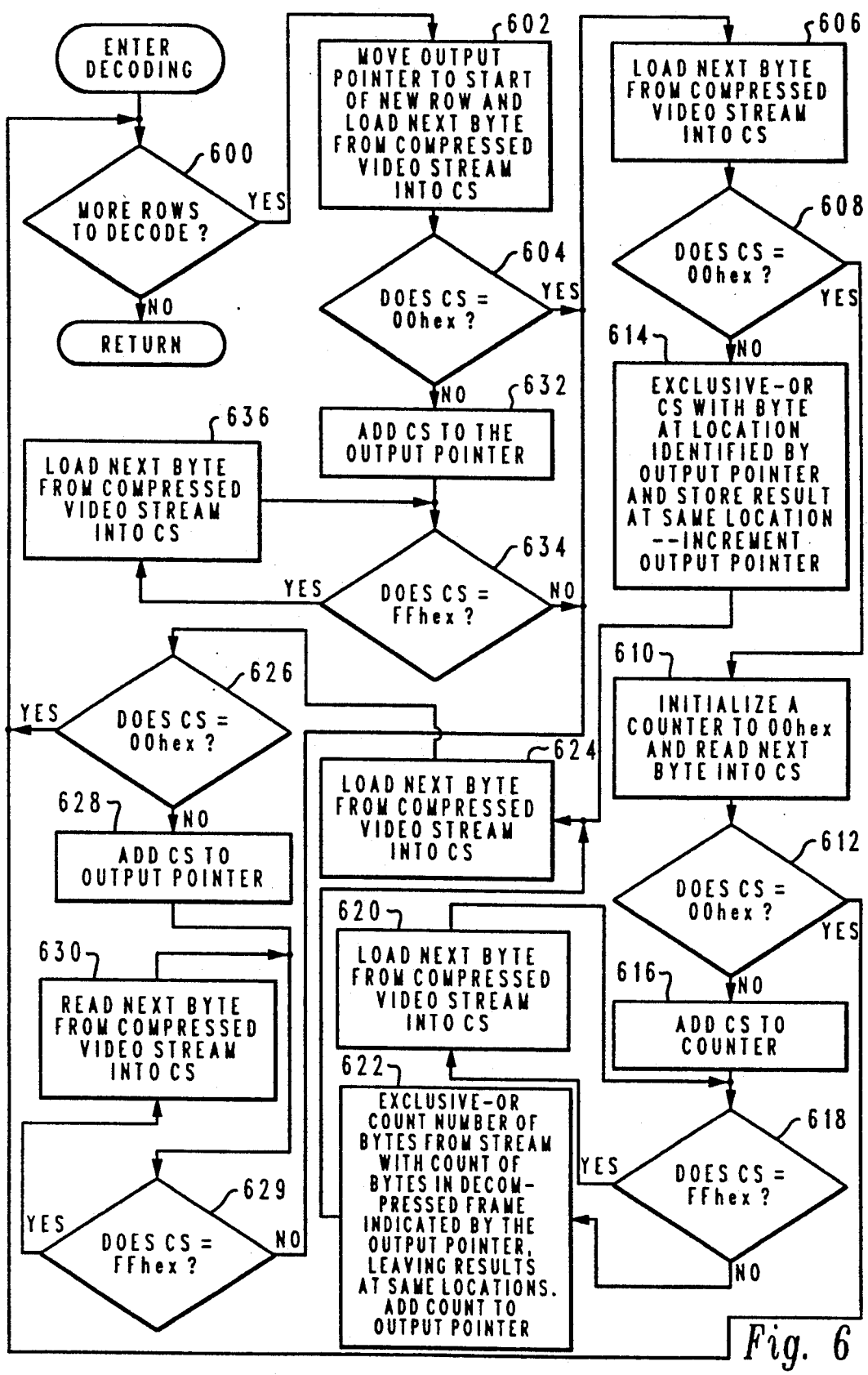
FIG. 6 is logical flow chart of a video decompression process used in implementing the method of the present invention.

FIG. 6 illustrates decoding of a compressed stream 70 into a decompression frame corresponding to a frame $F_i$ in a video display buffer. The process is entered at step 600 with a determination of whether any rows of the decompression frame remain to be updated. This is indicated by the current value of an output pointer pointing into the decompression frame. If the output pointer is through the array, the NO branch terminates the process.

Along the YES branch from step 600, step 602 is executed to move the output pointer to the beginning of the next row of the video buffer. The next byte from the compressed video stream is retrieved and stored in variable "CS." At step 604 it is determined if the retrieved byte equals $00_{hex}$. If it does, with execution of step 606 the next byte is retrieved from the compressed video stream and stored in "CS." Again, with step 608, the byte is compared to $00_{hex}$. If YES, step 610 is executed to initialize a counter to 0 and the next byte from the compressed stream is retrieved. At step 612 it is determined if the newest byte also equals zero. Three zero bytes in sequence signifies an empty row, and accordingly the YES branch from step 612 returns the process to step 600.

If "CS" does not equal $00_{hex}$ in step 604, it indicates that a chain of zero bytes begins the row but does not fill it and the NO branch from step 604 advances the process to step 632, where "CS" is added to the output pointer. By adding "CS" to the output pointer, pixel locations in the video buffer are skipped and they retain their value into the next frame to be displayed. At step 634 it is determined whether "CS" equals $FF_{hex}$. If it does not, the process continues along the NO branch to step 606 to begin evaluation of a sequence of non-zero bytes. If the byte equals $FF_{hex}$, indicating that the chain of zeros beginning the row is 255 or more pixels long, the next byte is recovered from the compressed video stream (step 636) and the process returns to step 632.

The NO branch from step 608 is taken if a single zero byte is encountered at the beginning of a compressed row (step 604) and the second byte (i.e. the one being obtained in step 606 and evaluated at step 608) has a positive value. This occurs where the first byte of a row of the exclusive-OR plane is non-zero and is followed by a chain of zero bytes. The byte retrieved at step 606 is then exclusive ORed with the byte indicated by the output pointer in the video buffer and the result is stored to the same location (step 614). The output pointer is then incremented by one.

If two zero bytes followed by positive values are encountered in the compressed stream upon entry to a new row, then a sequence of positive values in the exclusive-OR plane occurred. The NO branch from step 612 covers this situation. At step 616 the byte loaded into "CS" at step 610 is added to the counter initialized at step 610. Next, at step 618 the byte is compared to $FF_{hex}$. If the byte equals $FF_{hex}$, the next byte is read from the compressed stream (step 620) and the process returns to step 616. After a byte is recovered which does not equal $FF_{hex}$, the NO branch from step 618 is taken to step 622. Execution of step 622 results in recovery of a plurality of bytes from the compressed video stream equal in number to the count accumulated from step 616. An exclusive-OR operation is performed on the recovered bytes and the bytes in the corresponding locations in the video buffer. The results of the operation are stored to the same locations in the buffer and the accumulated count from step 616 is added to the output pointer.

Step 624 follows either step 614 or step 622 (i.e., after processing non-zero bytes). At step 624 the next byte from the compressed stream is recovered. At step 626 the byte is compared to $00_{hex}$, which if equaled, now indicates that no changed pixels exist in the balance of the row. The process is returned to step 600 along the YES branch. If the process advances along the NO branch, there is a string of zero bytes not extending to the end of the row. Steps 628, 629 and 630 are executed to determine the number of consecutive zeroes. The count accumulated equals the number of spaces which the output pointer is incremented. The process is then returned to step 606 to begin evaluation of a sequence of non-zero bytes which began at some point other than the first location of the row.

The coding process of the invention covers a wide range of video segments, including video segments of individuals speaking with a somewhat-stationary background, and panoramic video clips with motion trajectories. This coding algorithm has provided better compression than coding the bit map and the sequential list of pixel values that differed from the previous frame, while simultaneously reducing the numerical complexity of the decompression task and providing reverse playback capability without additional storage requirements.

While the invention has been particularly shown and described with reference to a preferred embodiment, it will be understood by those skilled in the art that various changes in form and detail may be made therein without departing from the spirit and scope of the invention.

What is claimed is:

1. A method of compressing a video segment allowing both forward and reverse playback from the compressed video segment, the method comprising the steps performed by a computer system of:
    mapping a video segment into a time ordered sequence of a plurality of frames, each frame comprising an M×N array of quantized values;
    comparing through an exclusive-OR operation the quantized values in corresponding locations of successive frames from the time ordered sequence of frames and placing null and non-null values representing results of the exclusive-OR operation into corresponding locations of an M×N result array;
    encoding each successive M×N result array as a stream of non-null values from the M×N result array and location information for null values from the M×N result array; and writing the stream to an output stage in a time ordered sequence.

2. A method as set forth in claim 1, further comprising the step of:

responsive to the computer system using L-bits of color resolution, quantizing values in each frame, either color or luminance, into L-bits per pixel.

3. A method of compressing a video segment for both forward and reverse playback as set forth in claim 1, wherein the step of encoding includes the steps of:

locating sequences of the null values in the M×N result array and inserting counts of the null values in the sequences into the compressed digital video stream; and locating sequences of the non-null values in the M×N result array and inserting counts of the non-null values in the sequences and the non-null values in the sequences into the compressed digital video stream.

4. A method of compressing a video segment for both forward and reverse playback as set forth in claim 1, wherein the step of encoding includes the steps of:

retrieving rows from an M×N result array in series;

for each row retrieved, determining a count of a sequence of null values beginning the row;

responsive to the count equalling N, inserting a marker value into the compressed data stream indicating that the row has no non-null values;

responsive to the count being fewer than N, inserting the count into the compressed data stream; and responsive to the count being fewer than N, inserting a sequence of non-null values following the last null value of the sequence beginning the row into the compressed data stream.

5. A method of compressing a video segment for both forward and reverse playback as set forth in claim 4, wherein the step of encoding further includes prior to the step of inserting the sequence of non-values values the steps of:

counting the non-null values in the sequence of non-null values;

responsive to the count being greater than one, inserting a marker indicating a sequence of non-null values including the count of the non-null values in the sequence.

6. A method of compressing a video segment for both forward and reverse playback as set forth in claim 5, wherein the step of encoding further includes after the step of inserting the sequence of non-null values the steps of:

counting the number of null values in sequence following the last non-null value of the sequence of non-null values;

determining if the end of the row was reached;

responsive to an affirmative determination, inserting a marker of an end of the row in the compressed data stream;

responsive to a negative determination and responsive to the count being greater than one, inserting the count of the sequence of null values;

further responsive to a negative determination and responsive to the count being greater than one, returning to the step of inserting a marker indicating a sequence of non-null values including the count of the non-null values in the sequence; and responsive to a negative determination and responsive to the count being one, inserting a non-null value corresponding to the value counted and returning to the step of inserting a marker indicating a sequence of non-null values including the count of the non-null values in the sequence.

7. A method of compressing a video segment for both forward and reverse playback as set forth in claim 6, and further comprising:

initializing an output pointer into locations in a decompressed video frame;

determining if a row in the decompressed video frame requires update;

responsive to an affirmative determination that a row in the decompressed video frame requires update, retrieving a value in sequence from the compressed video stream;

responsive to the value retrieved, changing the location the output pointer indicates in the decompressed video frame; and returning to the determining step.

8. A method of compressing a video segment for both forward and reverse playback as set forth in claim 7, and further comprising prior to the step of changing the location the output pointer indicates:

determining if the retrieved value indicates a sequence of null values;

if an affirmative determination is made that a sequence of null values is indicated, recovering the count of the null values in the sequence and returning to the step of changing location to displace the output pointer by the count;

determining if the retrieved value indicates a sequence of non-null values;

if an affirmative determination is made that a sequence of non-null values is indicated, retrieving the sequence of values and performing an exclusive-OR operation on the retrieved values and the contents of the locations indicated by the output pointer in the decompressed video frame;

if an affirmative determination is made that a sequence of non-null values is indicated, storing the results of the exclusive-OR operation to the locations indicated by the output pointer; and if an affirmative determination is made that a sequence of non-null values is indicated, recovering the count of the non-null values in the sequence and returning to the step of changing location to displace the output pointer by the count.

9. A method of compressing a video segment for both forward and reverse playback as set forth in claim 1, and further comprising:

initializing an output pointer into locations in a decompressed video frame;

determining if a row in the decompressed video frame requires update;

responsive to an affirmative determination that a row in the decompressed video frame requires update, retrieving a value or location information in sequence from the compressed data stream; and responsive to the value or location information retrieved, changing the location the output pointer indicates in the decompressed video frame.

10. A method of compressing a video segment for both forward and reverse playback as set forth in claim 9, and further comprising prior to the step of changing the location the output pointer indicates:

determining if the retrieved value or location information indicates a sequence of null values;

if an affirmative determination is made that a sequence of null values is indicated, recovering the count of the null values in the sequence and returning to the step of changing location to displace the output pointer by the count;

determining if the retrieved value indicates a sequence of non-null values;

if an affirmative determination is made that a sequence of non-null values is indicated, retrieving the sequence of values and performing an exclusive-OR operation on the retrieved values and the contents of the locations indicated by the output pointer in the decompressed video frame;

if an affirmative determination is made that a sequence of non-null values is indicated, storing the results of the exclusive-OR operation to the locations indicated by the output pointer; and if an affirmative determination is made that a sequence of non-null values is indicated, recovering the count of the non-null values in the sequence and returning to the step of changing location to displace the output pointer by the count.

11. A method of compressing a video segment for both forward and reverse playback as set forth in claim 9, wherein the step of writing includes:

after generating from each M×N result array a compressed digital data stream, storing the plurality of compressed digital data streams in a time ordered sequence.

12. A method of compressing a video segment for both forward and reverse playback as set forth in claim 11, comprising the further steps of:

retrieving the compressed digital data streams in reverse of the time ordered sequence.

13. A method of compressing a video segment for both forward and reverse playback as set forth in claim 11, comprising the further steps of:

retrieving the compressed digital data streams in the time ordered sequence.

14. A computer system for storing a video segment, comprising:

means for mapping a video segment into a time ordered sequence of a plurality of frames, each frame comprising an M×N array of quantized values;

means for comparing through an exclusive-OR operation the quantized values in corresponding locations of adjacent pairs of frames from the time ordered sequence of frames and placing null and non-null values representing lack of change and change, respectively from the exclusive-OR operation into corresponding locations of an M×N result array;

means for encoding an M×N result array as an output stream of non-null values from the M×N result array and location information for null values from the M×N result array; and a storage device having a storage media for receiving the output stream in a time ordered sequence.

15. A computer system for storing a video segment as set forth in claim 14, and further comprising means responsive to the computer system using L-bits of color resolution for quantizing original pixel values in each frame into L-bits per pixel.

16. A computer system for storing a video segment as set forth in claim 15, wherein the means for encoding includes:

means for locating sequences of the null values in the M×N result array and inserting counts of the null values in the sequences into the compressed digital video stream; and means for locating sequences of the non-null values result array and inserting counts of the non-null values in the sequences and the non-null values in the sequences into the compressed digital video stream.

17. A computer system for storing a video segment as set in claim 15, wherein the means for encoding further includes:

means for retrieving rows from an M×N result array in means responsive to retrieval of a row for determining a sequence of null values beginning the row;

means responsive to the count equalling N for inserting a into the compressed data stream indicating that the row has no non-null values;

means responsive to the count being fewer than N for count into the compressed data stream; and means further responsive to the count being fewer than N a sequence of non-null values following the last null value of the sequence beginning the row into the compressed data stream.

18. A computer system for storing a video segment in claim 17, wherein the means for encoding further includes:

means for counting the non-null values in the sequence of values;

means responsive to the count being greater than one for marker indicating a sequence of non-null values including the count of the non-null values in the sequence.

19. A computer system for storing a video segment as set in claim 18, wherein the means for encoding further include:

means for counting the number of null values in sequence last non-null value of the sequence of non-zero values;

means for determining if the end of the row was reached;

means responsive to an affirmative determination for of an end of the row in the compressed data stream;

means responsive to a negative determination and greater than one for inserting the count of the sequence of values;

means responsive to a negative determination and greater than one for inserting a marker indicating a sequence non-null values including the count of the non-null values in the sequence; and means responsive to a negative determination and count being one for inserting a non-null value corresponding to the value counted and inserting a marker indicating a sequence of non-null values including the count of the non-null values in the sequence.

20. A computer system for storing a video segment claim 19, and further comprising:

a video buffer for storing a decompressed video frame;

an output pointer into locations in the decompressed video means for determining if a row in the decompressed video requires update;

means responsive to an affirmative determination that a decompressed video frame requires update for retrieving a value in sequence from the compressed video stream; and means responsive to the value retrieved for changing the indicated by the output pointer in the decompressed video frame.

21. A computer system for storing a video segment in claim 20, and further comprising:
   means for determining if the retrieved value indicates a values;
   means responsive to an affirmative determination that a values is indicated for recovering the count of the null the sequence;
   means for determining if the retrieved value indicates a non-null values;
   means responsive to an affirmative determination that a non-null values is indicated for retrieving the sequence of values and performing an exclusive-OR operation on the values and the contents of the locations indicated by the pointer in the decompressed video frame;
   means responsive to an affirmative determination non-null values is indicated for storing the results of the exclusive-OR operation to the locations indicated by the pointer; and
   means responsive to an affirmative determination that a non-null values is indicated for recovering the count of the non-null values in the sequence.

22. A computer system for storing a video segment as set in claim 15, and further comprising:
   a video buffer;
   a decompressed video frame stored in the video buffer;
   an output pointer into locations in a decompressed video
   means for determining if a row stored in the decompressed requires update;
   means responsive to an affirmative determination that a decompressed video frame requires update for retrieving a or location information in sequence from the compressed data stream; and
   means responsive to the value or location information changing the location the output pointer indicates in the decompressed video frame.

23. A computer system for storing a video segment as set forth in claim 22, and further comprising:
   means for determining if the retrieved value indicates a sequence of null values;
   means responsive to an affirmative determination that a sequence of null values is indicated for recovering the count of the null values in the sequence;
   means for determining if the retrieved value indicates a sequence of non-null values;
   means responsive to an affirmative that a sequence of non-null values is indicated for retrieving the sequence of values and performing an exclusive-OR operation on the retrieved values and the contents of the locations indicated by the output pointer in the decompressed video frame;
   means responsive to an affirmative determination that a sequence of non-null values is indicated for storing the results of the exclusive-OR operation to the locations indicated by the output pointer; and
   means responsive to an affirmative determination that a sequence of non-null values is indicated for re-covering the count of the non-null values in the sequence and for displacing the output pointer by the count.

24. A computer system for storing a video segment as set forth in claim 22, further including:
   means responsive to generation of a compressed digital data stream from an M×N result array for storing the compressed digital data streams in a time ordered sequence to the storage device.

25. A computer system for storing a video segment as set forth in claim 24, further comprising:
   means for retrieving the compressed digital data streams in reverse of the time ordered sequence.

26. A computer system for storing a video segment as set forth in claim 24, further comprising:
   means for retrieving the compressed digital data streams in the time ordered sequence.

27. A computer system for playback of a video segment, comprising:
   a video buffer;
   an M×N decompressed video frame in the video buffer;
   an output pointer into locations in the M×N decompressed video frame;
   a storage media;
   a plurality of compressed data streams stored on the storage media in a time ordered sequence, each compressed data stream including coding of frame to frame differences of the video segment, which are represented in compressed M×N exclusive-OR planes of pixel change values for locations of the decompressed video frame and location displacement control values for the output pointer;
   means for recovering data stored on the storage media;
   means for determining if a row in the decompressed video frame requires update;
   means responsive to an affirmative determination that a row in the decompressed video frame requires update for retrieving a value from the compressed video data stream;
   means responsive to retrieval of a location displacement control value for changing the location the output pointer; and
   means responsive to retrieval of a pixel change value for the decompressed video frame for performing an exclusive-OR operation on the retrieved value and the contents of the location indicated by the output pointer in the decompressed video frame.

28. A computer system for playback of a video segment as set forth in claim 27, and further comprising:
   means for retrieving a compressed data stream in reverse of the time ordered sequence.

29. A computer system for playback of a video segment as set forth in claim 27, and further comprising:
   means for retrieving a compressed data stream in the time ordered sequence.

30. A method of replaying a video segment, comprising the steps performed by a computer system of:
   initializing an output pointer into locations in a decompressed video frame;
   determining if a row in the decompressed video frame requires update;
   responsive to an affirmative determination that a row in the decompressed video frame requires update, retrieving a value from a compressed video data stream stored on a storage recovery device, the storage recovery device storing a plurality of compressed data streams in a time ordered sequence, each compressed data stream including coding of frame to frame differences of the video segment, which are represented in compressed M×N exclusive-OR planes of pixel change values for locations of the decompressed video frame and location displacement control values for the output pointer;

responsive to retrieval of a location displacement control value, changing the location the output pointer; and responsive to retrieval of a pixel change value for the decompressed video frame, performing an exclusive-OR operation on the retrieved value and the contents of the location indicated by the output pointer in the decompressed video frame.

31. A method of replaying a video segment as set forth in claim 30, and further comprising:
   retrieving compressed data streams in reverse of the time ordered sequence.

32. A method of replaying a video segment as set forth in claim 30, and further comprising:
   retrieving compressed data streams in the time ordered sequence.

* * * * *